July 22, 1952  O. C. NORTON  2,603,994

FLUID ACTUATED PIPE VISE

Filed Dec. 2, 1949

INVENTOR
Orlo C. Norton
BY
Florian G. Miller
ATTORNEY

UNITED STATES PATENT OFFICE 2,603,994

FLUID ACTUATED PIPE VISE

Orlo C. Norton, Erie, Pa.

Application December 2, 1949, Serial No. 130,780

9 Claims. (Cl. 81—17.2)

This invention relates generally to pipe vises and more particularly to a pipe vise which may be power operated or hand operated as desired.

Power operated vises now on the market have parallel jaws with one movable relative to the other. These vises are not suitable for holding pipes and they are of little use in the field because there is no suitable means for operating the vise by hand. These prior vises are extremely noisy and it is difficult to retain a lubricant for the moving parts therein.

It is, accordingly, an object of my invention to overcome the above and other defects in power operated pipe vises and it is more particularly an object of my invention to provide a power operated pipe vise which is simple in construction, economical in cost, economical in manufacture, and efficient in use.

Another object of my invention is to provide a power operated pipe vise which releases the exhaust into the operating cylinder to retain the lubricant within the closed portion of the vise for long periods.

Another object of my invention is to provide a portable power operated vise which may be attached to any support or platform either in a shop or out in the field.

Another object of my invention is to provide a power operated vise which may be operated by hand.

Figure 1:
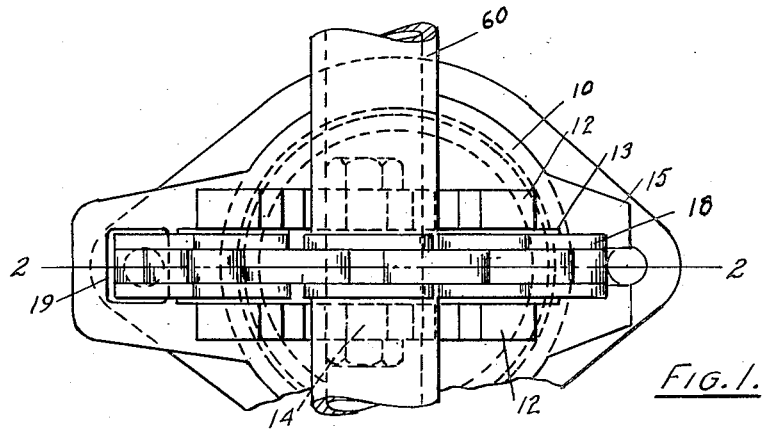
Figure 2:
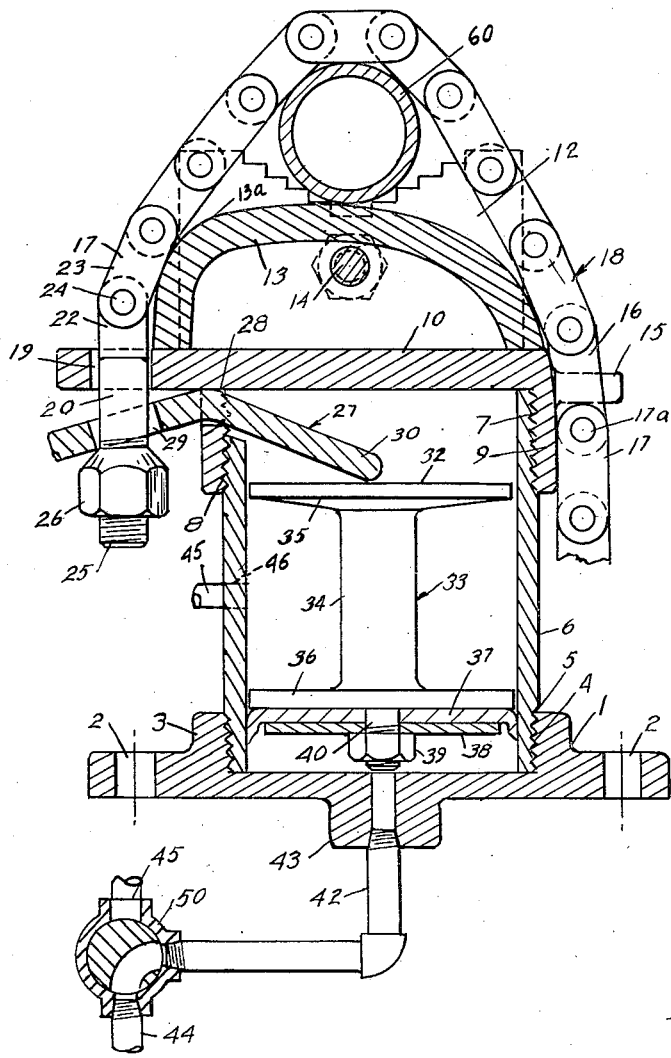

Other objects of my invention will become evident from the following detailed description, taken in conjunction with the accompanying drawings, in which Fig. 1 is a plan view of my novel pipe vise; and Fig. 2 is a view taken on the line 2—2 of Fig. 1.

Referring now to the drawings, I show in Figs. 1 and 2 a support plate 1 having apertures 2 for receiving screw bolts or the like for attachment to a support or table. The plate 1 has an upwardly flanged portion 3 internally threaded at 4 for receiving an externally threaded portion 5 of a cylinder 6. The upward end of the cylinder 6 is externally threaded at 7 for threadably engaging an internally threaded portion 8 of a depending flanged portion 9 of cap member 10. The cap member 10 has parallel stepped jaws 12 supported on the upper side thereof and separated by an arcuate shaped separating member 13, the jaws 12 being secured together by a bolt and nut assembly 14. The cap 10 has an outwardly extending, bifurcated bossed portion 15 on one side thereof for detachably engaging a central link 16 connecting pairs of links 17 of a chain 18. The chain 18 is trained over the member 13, a high side 13a thereof forming a snubbing surface for the chain 18. The opposite side of the cap 10 has an aperture 19 through which extends a cylindrical shaft or bolt 20 with an apertured flattened surface 22 on one end thereof for engaging a pair of end links 23 of the chain 18, end links 23 being secured to the apertured flat portion 22 of the bolt 20 by a pin 24. The depending end 25 of the shaft 20 is threaded for receiving a threaded nut 26. A rocking, angular cam member 27 extends through an aperture 28 in the depending flange 9 of the cap 10. The outer side of the member 27 has an aperture 29 through which extends the bolt 20 while the inner end 30 of the member 27 is engaged by the upper side 32 of a piston 33. The piston 33 comprises a center shaft 34 with longitudinally spaced, cylindrical disks 35 and 36 on the ends thereof. A cylindrical sealing washer 37 is secured to the bottom of the disk 36 by a washer 38 and a nut 39 threadably engaging a shaft 40 depending from the lower disk 36. A pipe line 42 is threadably engaged to an internally threaded, bossed, depending portion 43 of the support plate 1, the pipe 42 being connected to a three-way valve 50 which in turn is connected to a pipe line 44 connected to a suitable source of fluid, preferably air. The valve 50 also has a pipe 45 extending into aperture 46 in the side of the cylinder 6 to exhaust fluid into the cylinder 6 and thereby retain lubricant therein and minimize noise. The valve 50 may be operated by a foot control of the conventional type or by a hand control of any suitable conventional type.

In operation, a pipe 60 is seated on the stepped faces of the jaws 12 and the chain 18 is thrown over the pipe 60 and one of the links 16 is engaged with the bifurcated bossed portion 15 on the cap 10. The nut 26 is then turned clockwise if there is too much play between it and the end 28 of the rocking member 27 although this is usually not necessary. The valve 50 is then operated so that air passes from the pipe 44 through the valve 50 and through the pipe line 42 to the lower end of the cylinder 6 wherein the piston 3 is forced upwardly. As the piston 33 moves upwardly, the end 30 of the rocking cam member 27 is moved upwardly and the outer end 28 thereof is moved downwardly forcing the bolt 20 downwardly to tighten the chain 18 and draw the pipe 60 into engagement with the faces of the jaws 12 and the upper ends of the anchored pair of links 17 of the chain 18 into engagement with the bifurcated bossed portion 15. When the work on the pipe is completed, such as the threading of the pipe or the like, the valve 50 is rotated so that air passes through the pipe 45 to the cylinder 6 and the cam member 27 and the chain 18 are released. The pair of links 17 engaging the bifurcated bossed portion 15 is then pulled outwardly and the pipe is removed from the vise and another pipe is placed therein. Auxiliary support members may be used for long lengths of pipe.

Where a source of fluid, such as air, is not available, the pipe is secured by engaging a pair of links 17 of the chain 18 with the bifurcated bossed portion 15 of the cap 10 and the nut 26 is rotated in a clockwise direction until the chain 18 firmly secures the pipe 60 into engagement with the stepped face portions of the jaws 12.

The gist of my invention is the raised arcuate shaped portion 13a of the arcuate shaped separating member 13. It will be evident that as the diameter of the pipe 60 in the jaws 12 decreases, the chain 18 approaches a right angled turn around the raised portion 13a of the member 13, thereby limiting the closing pressure because of the greater friction between the chain 18 and the raised portion 13a of the cam 13; however, when it is attempted to turn the pipe in the jaws 12, the function of the cam surface 13a operates in reverse, making the holding pressure of the chain 18 at least three times greater than the closing pressure. Thus, my novel vise holds firmly in all cases and, even in extreme cases where it is necessary to unscrew rusted or frozen threaded members, my novel vise will not damage tubing or other light members. Pressure reducing valves are not necessary in my novel pipe vise.

It will be evident from the foregoing description that I have provided a novel pipe vise which accommodates various sizes and lengths of pipes, which provides simple means for adjusting the vise for any given diameter to be secured thereby, one which may be set up anywhere in the field, and one which may be operated efficiently either by air or other fluid or by hand.

Various changes may be made in the specific embodiment of my invention without departing from the spirit thereof or from the scope of the appended claims.

What I claim is:

1. A pipe vice comprising parallel jaws for seating a pipe, a support for said jaws, a chain for disposal over a pipe seated in said jaws, means on opposite sides of said support for engaging opposite ends of said chain, a cylinder associated with said support member, a piston movable in said cylinder, a source of fluid for operating said piston, and a rocking cam member engaging one end of said piston and one of said opposite ends of said chain, said cam member tightening said chain upon operation of said piston.

2. A pipe vise as set forth in claim 1 wherein said one end of said chain engaging said rocking cam member comprises a threaded shaft and nut assembly, said shaft extending through an aperture in said cam member whereby said chain may be selectively tightened by the rotation of said nut on said shaft.

3. A pipe vise as set forth in claim 1 wherein one of the means on the support engages the other of the opposite ends of said chain and comprises an outward extension on that side of the support lying opposite to said one end of said chain engaged by said cam member, said outward extension detachably connecting said other one of said chain.

4. A pipe vise as set forth in claim 1 wherein a member is disposed between said jaws, said member having the upper side thereof arcuate in shape for slidably supporting said chain thereon.

5. A pipe vise comprising a cylinder, a piston movable in said cylinder, means for moving said piston in said cylinder, a cap on one end of said cylinder, jaws supported by said cap, a chain for disposal over said jaws for securing a pipe in said jaws, means extending outwardly from opposite ends of said cap for detachably connecting opposite ends of said chain, and a cam member engaging one of said opposite ends of said chain and engageable by said piston to move said chain longitudinally to tighten said chain over a pipe in said jaws.

6. A pipe vise as set forth in claim 5 wherein said cam member comprises a rocking angled member having one end engaging the top of said piston and the other end thereof being engaged by said one end of said chain, the central portion of said rocking angled member being fulcrumed on the under side of said cap.

7. A pipe vise as set forth in claim 6 wherein the outer end of said rocking angled member is apertured and said one end of said chain has a threaded shaft and nut assembly, the shaft extending through the aperture in said rocking angled member and the nut threadably engaging said shaft.

8. A vise comprising a cylindrical member having an inlet communicating with a source of fluid under pressure, a cap on said cylindrical member having chain anchoring means on opposite sides thereof, vertically extending jaws mounted on said cap for seating a pipe, a link chain detachably anchored on opposite sides of said cap to said chain anchoring means to secure a pipe in said jaws, an angular rocking cam member having one end thereof engaging one end of said chain to anchor same and the other end thereof extending into said cylinder, said angular rocking member being fulcrumed on the underside of said cap, and a piston in said cylinder operable by said fluid to engage and rock said other end of said cam member, whereby the outer end of said cam member pulls said chain downwardly when said piston rocks said cam member.

9. A pipe vise comprising spaced, parallel jaws for seating a pipe, a support for said jaws, an arcuate shaped member disposed between said jaws transversely of a pipe supported therein, said member having the upper side thereof arcuate shaped, one side of said arcuate shaped upper portion of said member being substantially raised with respect to the opposite side thereof, a chain disposed over said arcuate shaped member and between said jaws for securing a pipe in said jaws, said chain being slidably supported on opposite sides of said arcuate shaped member, means for tightening said chain on the side of said arcuate shaped member that is raised, the raised portion of said arcuate shaped member frictionally engaging a greater proportion of said chain than the lower side of said arcuate shaped member when said chain is disposed over a pipe, and means for anchoring said chain to said support member and adjacent lower side of said arcuate shaped member.

ORLO C. NORTON.

REFERENCES CITED

The following references are of record in the file of this patent:

UNITED STATES PATENTS

| Number | Name | Date |
| --- | --- | --- |
| 827,079 | Clark | July 31, 1906 |
| 1,081,279 | Hedden | Dec. 9, 1913 |
| 1,911,538 | Thewes | May 30, 1933 |
| 1,954,920 | Damerell | Apr. 17, 1934 |